US009903252B2

(12) United States Patent
Weidner et al.

(10) Patent No.: US 9,903,252 B2
(45) Date of Patent: Feb. 27, 2018

(54) METHOD FOR ENCASING A BODY OF AN EXHAUST GAS SYSTEM

(71) Applicant: TENNECO GMBH, Edenkoben (DE)

(72) Inventors: Michael Weidner, Edenkoben (DE); Thomas Weidner, Edenkoben (DE)

(73) Assignee: TENNECO GMBH, Edenkoben (DE)

( * ) Notice: Subject to any disclaimer, the term of this patent is extended or adjusted under 35 U.S.C. 154(b) by 365 days.

(21) Appl. No.: 14/929,947

(22) Filed: Nov. 2, 2015

(65) Prior Publication Data

US 2016/0053662 A1  Feb. 25, 2016

Related U.S. Application Data

(62) Division of application No. 13/824,008, filed as application No. PCT/EP2011/066134 on Sep. 16, 2011, now Pat. No. 9,206,730.

(30) Foreign Application Priority Data

Sep. 17, 2010  (DE) ........................ 10 2010 045 638

(51) Int. Cl.
| | |
|---|---|
| *F01N 13/18* | (2010.01) |
| *B21C 37/08* | (2006.01) |
| *B21C 37/09* | (2006.01) |
| *B21D 49/00* | (2006.01) |
| *B32B 15/04* | (2006.01) |
| *F01N 1/02* | (2006.01) |
| *F01N 3/28* | (2006.01) |

(52) U.S. Cl.
CPC .......... *F01N 13/18* (2013.01); *B21C 37/0815* (2013.01); *B21C 37/09* (2013.01); *B21D 49/005* (2013.01); *B32B 15/04* (2013.01); *F01N 1/02* (2013.01); *B23P 2700/03* (2013.01); *F01N 3/2857* (2013.01); *Y10T 428/2924* (2015.01)

(58) Field of Classification Search
CPC . F01N 13/18; F01N 1/02; B23B 15/04; B21C 37/09; B21C 37/0815; B21D 49/005
See application file for complete search history.

(56) References Cited

U.S. PATENT DOCUMENTS

| | | |
|---|---|---|
| 5,150,850 A | 9/1992 | Adams |
| 5,425,258 A | 6/1995 | Bogart |
| 5,431,036 A | 7/1995 | Bogart |

(Continued)

FOREIGN PATENT DOCUMENTS

| | | |
|---|---|---|
| CN | 1161208 A | 8/2004 |
| DE | 102 57 651 A1 | 7/2004 |
| DE | 601 07 267 T2 | 11/2005 |

(Continued)

*Primary Examiner* — Moshe Wilensky
(74) *Attorney, Agent, or Firm* — Hudak, Shunk & Farine Co. LPA

(57) ABSTRACT

A method for encasing a body of an exhaust gas system with a housing which is wound around the body. Using a winding method, the body is placed in a loop formed by a belt-shaped conveyor element that can be driven in a conveyor device, wherein the conveyor element is seated against the outer casing face at a wrapping angle u of at least 270 degrees. Starting with a first edge, the metal strip is then introduced in a conveyor device between the body and the conveyor element, is drawn into the gap between the body and the conveyor element and is bent around the body until the body is encased at least twice by the metal strip.

9 Claims, 5 Drawing Sheets

(56) References Cited

U.S. PATENT DOCUMENTS 6,405,437 B1 6/2002 Sussmilch et al.
7,065,999 B2 6/2006 Fukuchi et al.

FOREIGN PATENT DOCUMENTS

| DE | 10 2006 026 814 A1 | 3/2007 |
| --- | --- | --- |
| FR | 871 659 | 5/1941 |
| JP | 05139577 A | 6/1993 |
| JP | 08 284656 | 10/1996 |
| JP | 11002119 A | 1/1999 |
| JP | 2000343118 A | 12/2000 |
| JP | 2001248432 A | 9/2001 |
| JP | 200522783 A | 1/2005 |
| JP | 4061091 B2 | 3/2008 |
| JP | 4948133 B2 | 6/2012 |
| WO | 99 14119 A2 | 3/1999 |

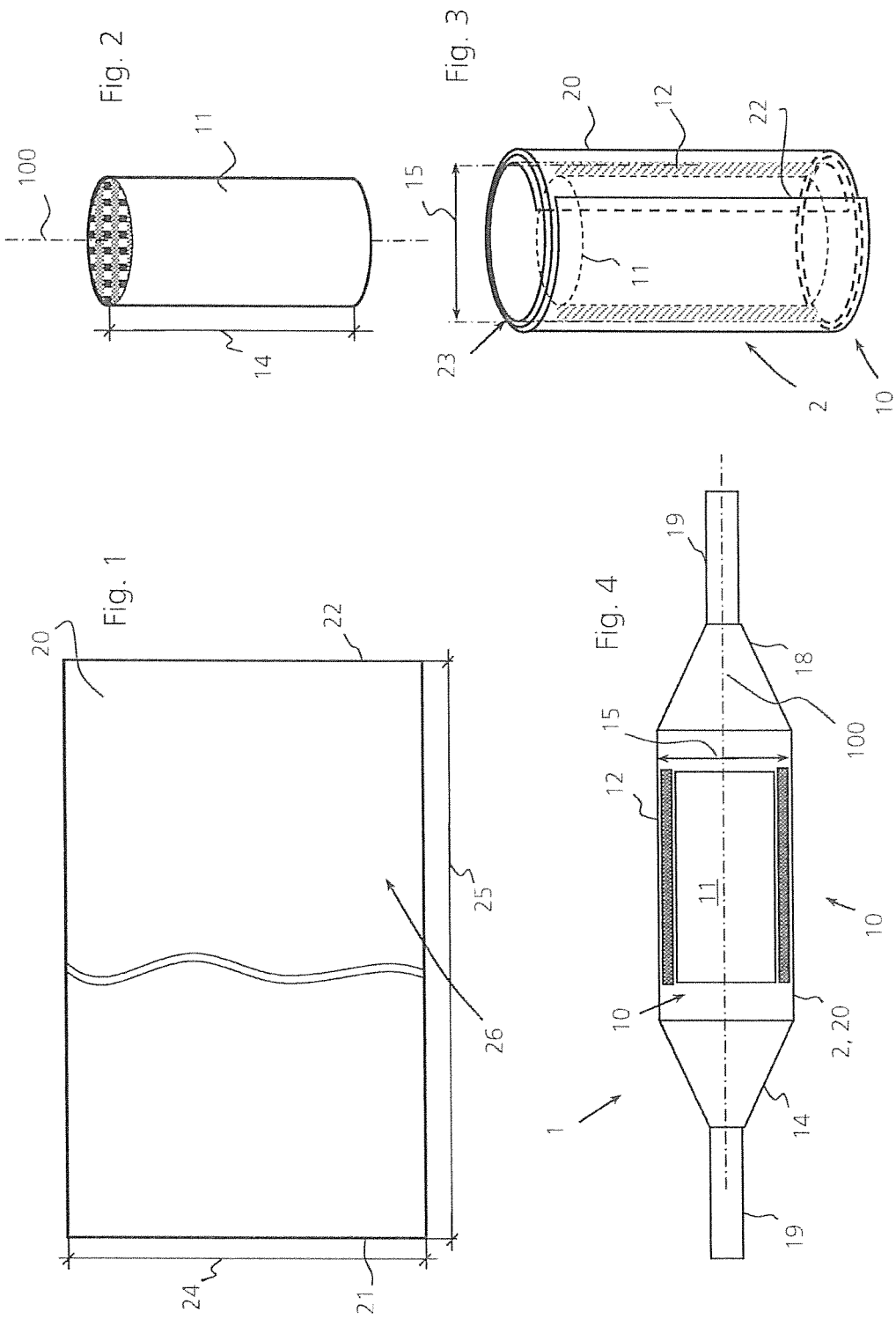

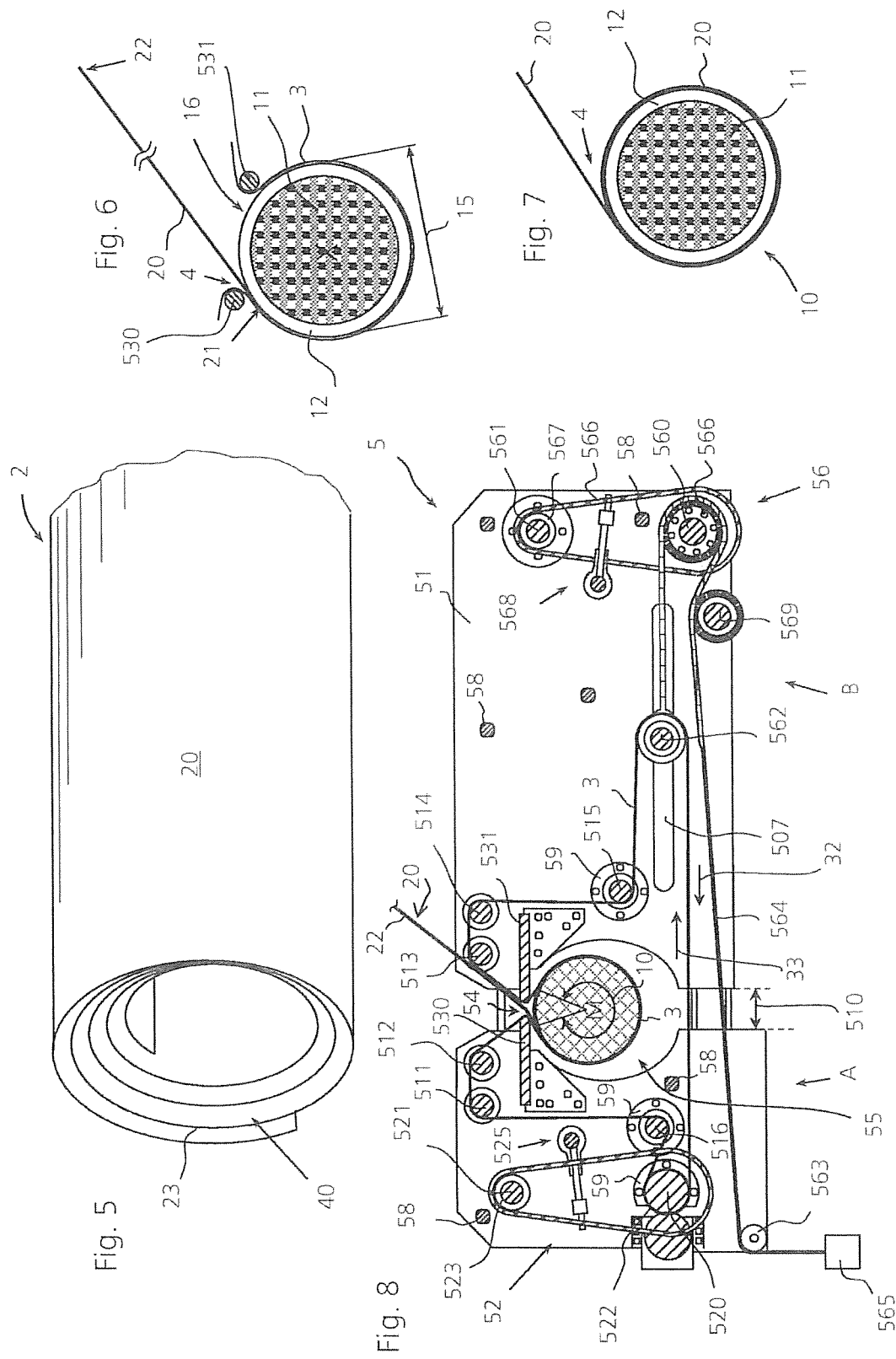

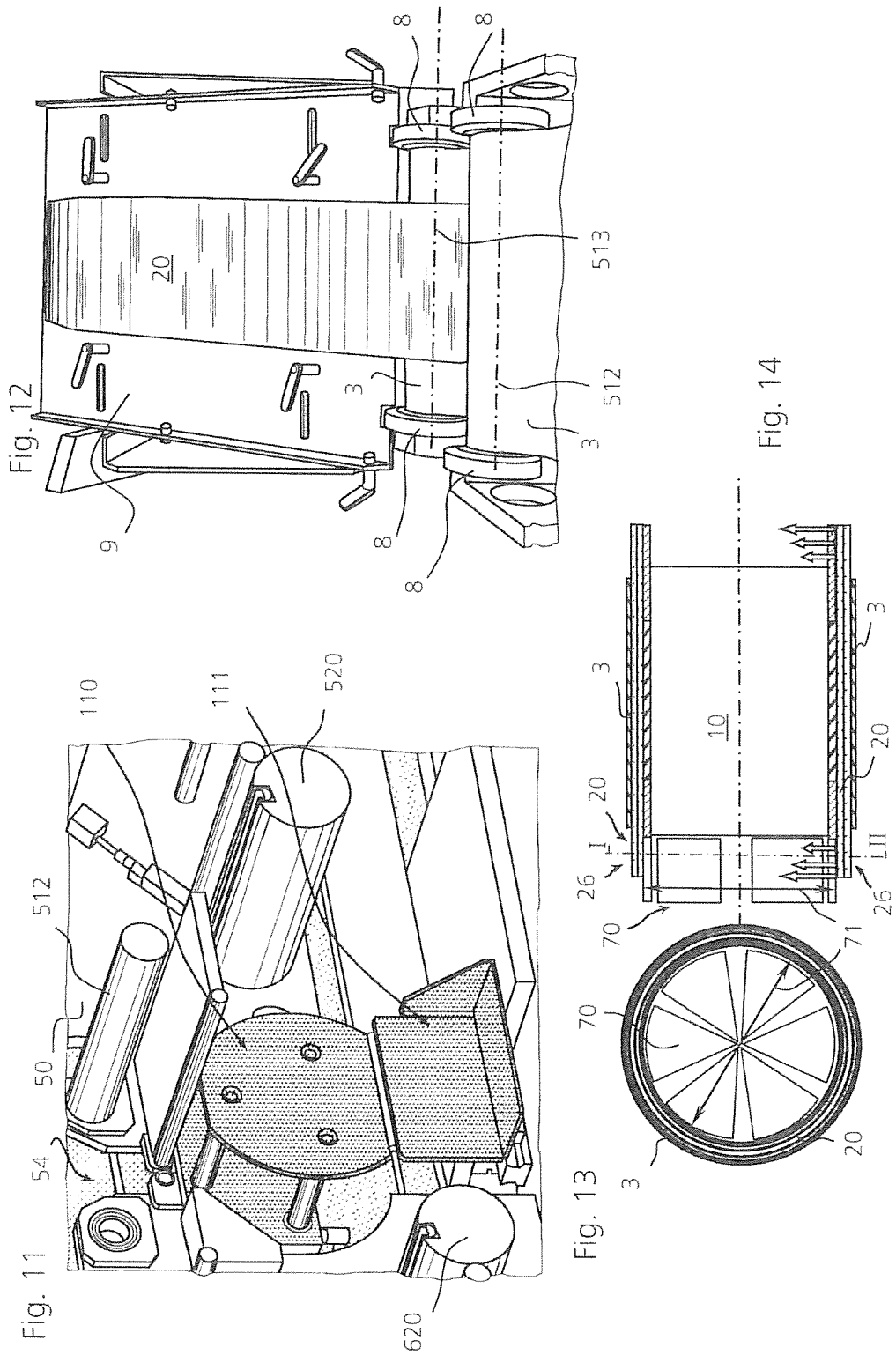

METHOD FOR ENCASING A BODY OF AN EXHAUST GAS SYSTEM

FIELD OF THE INVENTION

The invention relates to a method for encasing a body of an exhaust gas system with a housing, wherein the body has an outer envelope surface with a circumference and the housing is formed from at least one single-piece metal strip with a width and a length.

BACKGROUND OF THE INVENTION

Such bodies serve to filter diesel exhaust or for catalytic cleaning of exhaust from internal combustion engines and have a monolithic sintered body. The housing enables a connection to the exhaust system of the internal combustion engine. The mounting and fixation of the monolithic body in the housing is problematical, since the porous ceramic substance has only a limited mechanical strength. It is therefore not possible to exert rather large clamping forces on the body to accomplish its secure and firm mounting.

A further difficulty in the mounting results from the need to compensate for the relatively large cross section tolerances of the body which occur during the fabrication, as well as the differences in thermal expansion which occur as a result of different coefficients of thermal expansion of the body material and the metal housing.

In the special field of exhaust catalytic engineering for automobiles, there are basically three main designs of catalysts, namely, tube catalysts, housing catalysts, and wound catalysts. The present invention refers to wound catalysts.

In DE 102 57 651 A1 is described a winding method for a catalyst body, in which at first a metal plate or a metal strip is deformed. This metal strip, hereinafter generally called a blank, is bent into a cylinder, so that its two opposite end regions overlap. After a monolith coated with a catalytically active material, especially one in ceramic form, has been wrapped in a support mat, the combination of monolith and mounting mat, here called the body, is shoved into the winding of the housing envelope. This winding is then stretched so that it firmly surrounds the body in the required manner. The winding, stretched in this way into its end shape, forms a housing or in general a housing envelope of the catalyst housing and is tacked with spot welds for fixation to certain places. At the end face, entry and exit funnels are arranged, being designed according to requirements for fastening to an exhaust pipe. The fastening of the entry and exit funnels is done each time by means of a circular weld seam along the edges of the housing envelope. To accomplish an optimal sealing of the catalyst housing, the exterior edge of the winding or housing envelope is joined by means of a weld seam to the underlying portion of the winding or housing envelope, i.e., the overlap is welded shut.

In DE 10 2006 026 814 A1 is described a housing in which a metal sheet as the housing envelope is wound onto the two end sheets at the entry and exit end. The long thin sheet is wound in several layers on the end sheets and then joined to them. The thin sheet can be easily wound. The multiple layers produce an excellent noise suppression, so that such housings give off practically no mechanical vibrations. Furthermore, the multiple layers at the same time act as a labyrinth seal, so that a simple fixation of the outer end of the metal sheet is entirely adequate, such as by a few weld spots.

In WO 9914119 (A2) is described a device for closing a housing in which spacers with a special surface are arranged in the circumferential direction about the housing so that they are fitted to the surface of the housing. The spacers here are contained in a circular mat that is enclosed around the housing in the circumferential direction.

According to DE 601 07 267 T2, a housing is formed by sheet metal elements that are joined together in the axial direction by roll-seam welding.

In JP 08284656 A is described a housing consisting of two metal strips arranged one on the other, which are partly overlapping in the circumferential direction.

SUMMARY OF THE INVENTION

The problem of the present invention is to provide a method in which a metal strip of the housing can be wound around the body in a single work step and at the same time it is possible to adapt the inner diameter of the body to the size of the body during the process and without measuring the body.

The problem is solved by a winding method in which the body is placed in a loop formed by a belt-shaped conveyor element that can be driven in at least one conveyor device, wherein the conveyor element is seated against the outer envelope surface at a wrapping angle of at least 270 degrees. Starting with a first edge, the metal strip is then introduced in a conveyor device between the body and the conveyor element. After this, the metal strip is drawn into a gap between the body and the conveyor element and at the same time it is wound around the body with the drawn-in portion of the metal strip. The conveyor element is operated until the body is encased at least twice by the metal strip.

The method ensures that the multiple encasing of the body with a metal strip occurs continuously in a single work step and the radial pressure required by the housing is produced in the perpendicular direction to the envelope surface of the body during the winding process Wrapped at least twice means that at least two complete 360-degree layers of strip are arranged about the body and the body is fully encased in strip at least twice. In other embodiments, up to six layers of strip can be provided, depending on the strip thickness.

Since in this method the pressure of the housing on the body is adjusted solely by the tension of the continuously moving conveyor element, the tolerances of the body due to manufacturing need not be taken into account, since the conveyor element in the case of bodies of different size produces the same radial pressure by the housing, due to the same tension.

Thanks to the continuous movement of the conveyor element, a relative movement of the individual layers of the metal strip is possible. The degree of the relative movement depends on the number of layers of the metal strip and the particular wrap angle.

Preferably, the length dimension of the metal strip encircling the body is 2.2 to 6.6 times the circumferential dimension of the body. In this way, it is possible to vary the rigidity of the housing and adjust different strip thicknesses. The strip thickness can be reduced with the number of layers.

It is advantageous in this method that the body is formed at least from a sintered body and at least one mounting mat arranged about the sintered body, wherein the mounting mat is compressed to an adjustable degree by turning the body in the conveyor element before feeding the metal strip. In it important in this winding method that the adjusting of the pressure of the housing on the body, which is necessary for a secure mounting, is possible both in regard to the dimensional tolerances of the sintered body and in regard to the thickness tolerances of the mounting mat, without having to take measurements of the tolerances in advance. Accordingly, it is possible to encase bodies that do not have a completely round cross section. This includes sintered bodies with an oval or rounded cross section.

This method can also be used to produce mufflers, in which the body constitutes the inner structure of a muffler which is encased with a metal strip, constituting the housing.

Basically, the conveyor element is arranged to be driven by an electric motor or a manual crank indirectly across one or two drive shafts. The drive system also produces the necessary tension of the conveyor element for the winding process.

Moreover, it is advantageous that the radial pressure of the conveyor element in the direction perpendicular to the envelope surface can be held constant or varied during at least part of the process by the torque generated on the drive shafts. The degree of variation in the tension of the conveyor element is dependent on the property and surface texture of the material of the metal strip. By the continuous rolling of the body in the continuously moving conveyor element, an extremely accurate adjusting of the radial pressure is possible. The pressure is preferably adjusted by regulated motors, by which the conveyor element is rolled on and off or moved.

It is of special importance to the present invention that the edge region of the metal strip stands out from the body in the direction axial to the axis of rotation and during the wrapping of the body it is wound at the same time onto a diameter-adjustable expanding mandrel or onto a spacer with a nonvariable diameter. This ensures that the diameter of the housing is also kept sufficiently constant in the edge region.

It is of special importance to the present invention that the metal strip is at least partly coated with a lubricating and/or adhesive and/or sealing compound. By the use of a lubricating compound, it is possible to more easily adjust the radial pressure of the housing, because thanks to the improved sliding properties between the layers of the metal strip the tension of the conveyor element can be reduced. With a sealing compound, corrosion between the layers is primarily prevented, since no corrosive agents can get in between the layers. With an adhesive compound, the strength of the housing can be improved, because the individual layers are fixed relative to each other. Preferably, an agent will be used that fulfills all three properties. Such an agent can slide during the winding process and hardens at a later time, retaining its sealing property.

After the wrapping of the body, the second edge of the metal strip, which forms the end of the metal strip, is joined at least partly to the portion of the metal strip already wrapped around the body. In this way, the housing is enclosed and the tension of the housing is fixed at the end of the process.

In connection with the invented configuration and arrangement of the method, a winding device for the encasing of a body of an exhaust system with a metal strip as the housing is advantageous that has at least two parallel arranged side pieces and several axles and shafts mounted in the side pieces and able to rotate. The side pieces and the axles and shafts form a machine housing. The width of the machine housing corresponds at least to the width of the metal strip. Furthermore, a belt-shaped conveyor element is provided, which is mounted on the axles and shafts and can be driven in at least one of the directions of conveyance by at least one driving device of the winding device, provided on the shafts. The conveyor element forms the core of the winding process. Between the side pieces are provided two deflection elements, arranged parallel to the axles, forming a gap running parallel to the axles, with the conveyor element mounted on them. The gap forms the feed opening for the metal strip. Thus, a winding space is formed beneath the gap, bounded by the axles and situated between the side pieces. The belt-shaped conveyor element projects on either side of the gap beyond the two deflection elements into the winding space and forms a loop in the winding space, in which the body being wrapped can be placed.

Moreover, it is advantageous that the conveyor element is closed endlessly or open, and at least two axles and at least two shafts are provided, around which the conveyor element is passed, while at least one shaft can be driven directly or indirectly via the drive device. The shaft configured as the drive shaft can be driven by a motor or a manual tool from outside the two side pieces.

Moreover, it is advantageous that the winding device has a tensioning device and the tension of the conveyor element can be adjusted directly or indirectly via the tensioning device and the tension can be used to vary or hold constant the radial pressure of the conveyor element in the direction perpendicular to the envelope surface of the body. The radial pressure exerted by the conveyor element is critical to the winding tension of the metal strip and to the ultimate diameter of the housing that is formed by the closed metal strip. Drive motors of the shafts on which the conveyor element is wound by its respective end are also provided as tensioning devices.

In one preferred embodiment for a series manufacturing, it is advantageous that the open conveyor element has two ends, while the respective end is wound each time on one of the shafts and the respective end is driven each time by a regulated motor. For the tensioning of the conveyor element, both shafts are driven and braked at least partly with different speed and/or different torque, in order to avoid a separate tensioning device.

It is essentially advantageous that the spacing forming the gap between the two deflection elements can be varied for placing the body in and taking it out. Preferably, the spacing of at least two axles and/or shafts arranged opposite each other in relation to the gap is also variable for placing the body in and taking it out. Because the spacing can be reduced once more after the body has been placed in it, the wrap angle of the conveyor element about the body can be maximized, so that a precise pressure adjustment is possible for the wrapping. It is also advantageous that the width of the gap for wrapping the body can be varied in a range between 2 mm and 30 mm. The wrap angle is increased by a very small gap width, but it is also possible to increase the gap depending on the strip thickness and the bending capacity of the metal strip.

This simplifies the mounting of the axles and shafts, since the bearings of the individual axles and shafts do not have to be moved directly for the body to be placed in and taken out.

Finally, it is advantageous that the respective side piece is configured as a two-part piece and forms two housing pieces each time, and the two housing pieces can be displaced or swiveled to vary the spacing relative to each other in at least one direction and also fixed relative to each other by an end stop. The fixation serves to maintain the tension in the conveyor element during the winding process, so that the two housing pieces are not shoved apart by the tension.

Furthermore, it is advantageous that an expanding mandrel of adjustable diameter or a spacer with a nonvariable diameter is provided, which is arranged coaxial to the body and can be wound onto the edge region of the metal strip. This ensures that the diameter of the housing is also held sufficiently constant in the edge region.

It is also advantageous that guide elements for the conveyor element are provided on at least two axles or on at least two shafts, forming an end stop for the conveyor element in the axial direction. The metal strip and the body, as well as the conveyor element, must be adjusted relative to each other in the directions perpendicular to the axis of rotation. Thanks to the guide elements, the position of the conveyor element is constant in the axial direction.

The object of invention is also a structural part for an exhaust system, consisting of a body with a round or oval or rounded cross section in relation to the direction of flow and a circumference, as well as a housing surrounding the body with a round or oval or rounded cross section. The housing is formed from at least one single-piece metal strip. The length of the metal strip in the circumferential direction about the body corresponds to 2.2 to 6.6 times the dimension of the circumference of the body and the housing is formed from several layers of the metal strip wound about the body. For this, it is advantageous for the metal strip to have a thickness between 0.2 and 0.3 mm.

Moreover, it is advantageous to provide a lubricating and/or adhesive and/or sealing compound between the individual layers of the metal strip. With such a compound, thanks to its sliding properties in a still liquid or paste-like state, the individual layers of the metal strip slide against each other. This sliding is accomplished by the tension applied by the conveyor element, which in turn produces a particular diameter of the housing. The better the sliding properties, the less tension needed for the precise adjustment of the diameter. Furthermore, the compound accomplishes a continuous sliding of the individual layers proportionately to the tension of the conveyor element.

The compound can also prevent corrosion in the gap between the individual layers, since the compound seals off the gap. Furthermore, the dried compound, depending on its elasticity, influences the elasticity of the housing. Precisely when a very thin-walled metal sheet is used, the compound can produce the necessary elasticity, as well as the necessary stability of the housing. Thus, the housing is a multilayered part consisting of the metal strip and the compound.

In order to close the housing or the winding of metal strip, the edge at the end of the metal strip is joined at least partly to a portion of the metal strip that is wrapped around the body. The wrapping is fixed in place by this and the gap between the uppermost and the second partial region of the metal strip is closed.

Preferably, the body is formed from a sintered body and a mounting mat arranged about the sintered body. The sintered bodies are used as converters, filters or catalysts. However, this type of housing can also be used for mufflers in which the body is formed from sheet metal parts such as pipes and walls and has neither a sintered body nor a mounting mat.

BRIEF DESCRIPTION OF THE DRAWINGS

Further benefits and details of the invention are explained in the patent claims and the specification and represented in the figures. There are shown:

FIG. 1 a schematic view of a metal strip;
FIG. 2 a perspective view of a round sintered body;
FIG. 3 a perspective view of a metal strip wound about a sintered body with a mounting mat;
FIG. 4 a schematic of part of an exhaust system with a device according to FIG. 3;
FIG. 5 a perspective view of a wound metal strip;
FIG. 6 a side view of a body prior to the winding process;
FIG. 7 a side view of a body during the winding process;
FIG. 8 a side view of a winding device with a closed conveyor element;
FIG. 12 a front view of a winding device from above with a feed for the metal strip and end stops for the conveyor element;
FIG. 13 a cross sectional representation of an expanding mandrel with the housing and the conveyor element according to the cross sectional view of FIG. 14;
and
FIG. 14 a cross sectional view of a wound body in a loop formed by the conveyor element.

DETAILED DESCRIPTION OF THE INVENTION

Figure 9:
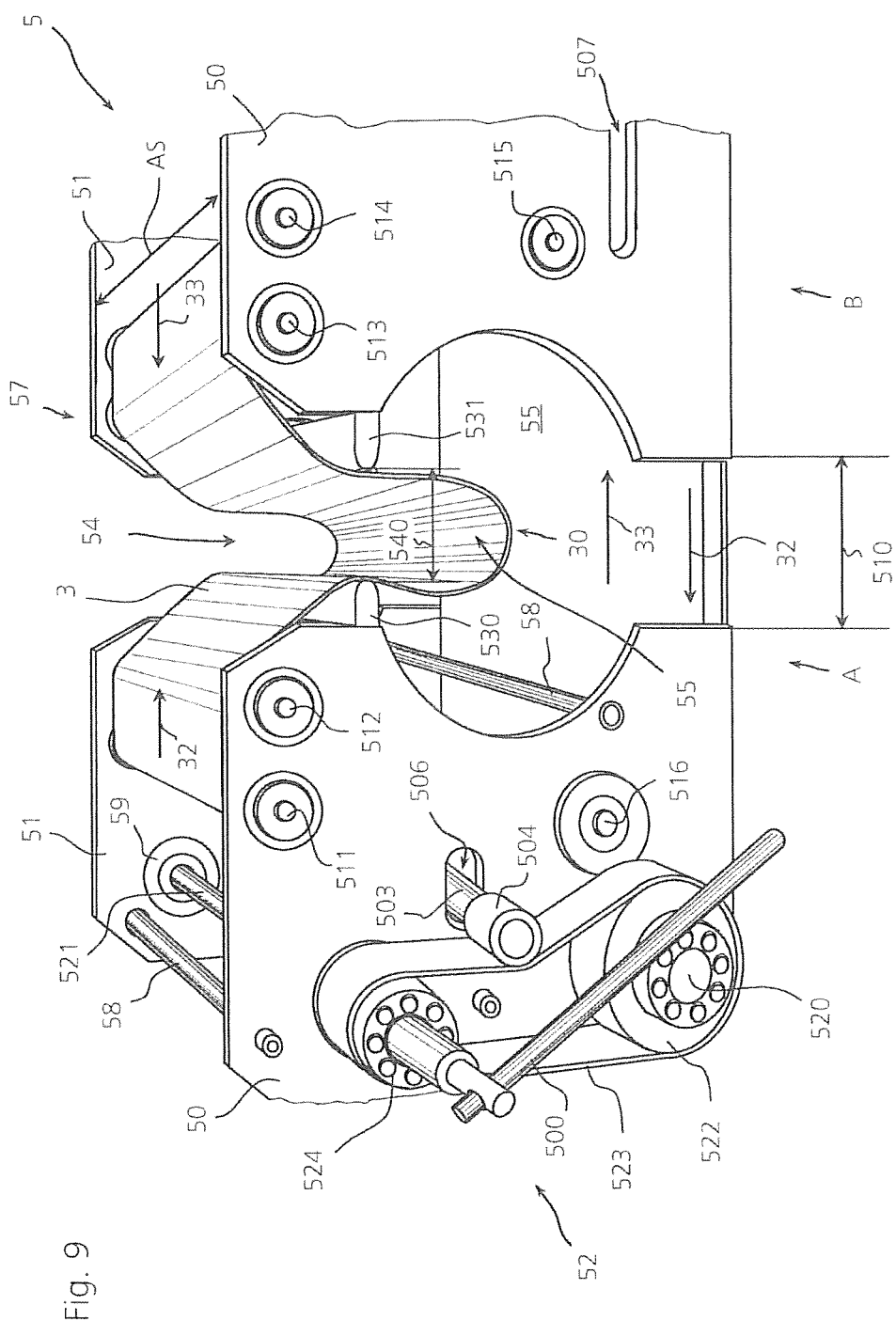
FIG. 9 a perspective view of a winding device according to FIG. 8
FIG. 10 a front view of a winding device per FIG. 9 with two shafts driven by motors and an open conveyor element
FIG. 11 an inside view of a winding device with a guide plate and an end stop.

With the method of the invention, a body 10 [FIG. 2] of an exhaust system 1 [FIG. 4] is wrapped in a metal strip 20 such that the wound metal strip 20 forms a housing 2. In FIG. 1, a metal strip 20 with a thickness of 02 mm and two edges 21, 22 is shown, being used for the method. The two longitudinal sides of the metal strip 20 have an edge region 26 which can project beyond the sintered body 11 at the side after the wrapping, depending on the ratio of the length 14 of the sintered body 11 to the width 24 of the metal strip 20. In the sample embodiment described, the width 24 of the metal strip 20 is 25% greater than the length 14 of the sintered body 11.

The length 25 of the metal strip 20 is around four times the circumference of the body 10, consisting of the sintered body 11 and a mounting mat 12. The circumferential dimension as usual corresponds to the product of a diameter 15 and π. The diameter 15 varies according to the thickness of a mounting mat 12 and the diameter of a sintered body 11.

In FIG. 2 the sintered body 11 is shown, being wrapped in a mounting mat 12 according to FIGS. 3 and 4. The sintered body 11 preferably has a channel structure, in which the exhaust gas is catalytically treated and/or filtered. The body 10 consisting of the sintered body 11 wrapped with the mounting mat 12 is wrapped with the metal strip 20 according to the method of the invention, using a winding device 5 according to FIGS. 8 to 10. In this process, the metal strip 20 starting with the edge 21 is wrapped several times about the body 10, so that several layers 23 [FIG. 5] are formed. The mounting mat 12 is compressed by the winding of the metal strip 20, so that the sintered body 11 is fixed in place. Depending on the tension of the metal strip 20, the mounting mat 12 is more or less compressed.

In FIG. 4 is shown a sample embodiment in which the body 10 is configured as a converter and integrated in one part of an exhaust system 1. The metal strip 20 wrapped about the body 11 forms the housing 2 for the body 11 or for the converter. The wound metal strip 20 is joined at both end faces of the housing 2 to exhaust pipes 19 across nozzles 18. These constitute part of the exhaust system 1.

In FIG. 5 is shown a perspective view of a wound metal strip 20. Thanks to the winding, between three and five layers 23 are formed in this sample embodiment, depending on the circumferential position. A larger or smaller gap 40 is formed between the layers, depending on the winding density, into which a lubricating or adhesive or sealing compound can be introduced in a later process.

FIG. 6 shows a side view of the body 10 prior to the winding process. The metal strip 20 is introduced into the gap 4 between the conveyor element 3 and the body 10 and lies with its edge 21 or underside in front, tangentially against the circumferential surface of the mounting mat 12 of the sintered body 11. The circumferential surface of the mounting mat 12 at the same time forms the envelope surface 16 of the body 10. By its top side, the metal strip 20 lies against the conveyor element 3. For reasons of clarity, the conveyor element 3 is shown at a distance from the body 10, although there is no spacing during the winding.

As shown in the side view of FIG. 7, the body 10 is wrapped repeatedly with the metal strip 20. By means of the mounting mat 12, the sintered body 11 is mounted and fixed in place in the housing 2 formed by the metal strip 20 in the axial and radial direction, individually adapted to the particular dimension tolerance of the sintered body 11.

Figure 10:
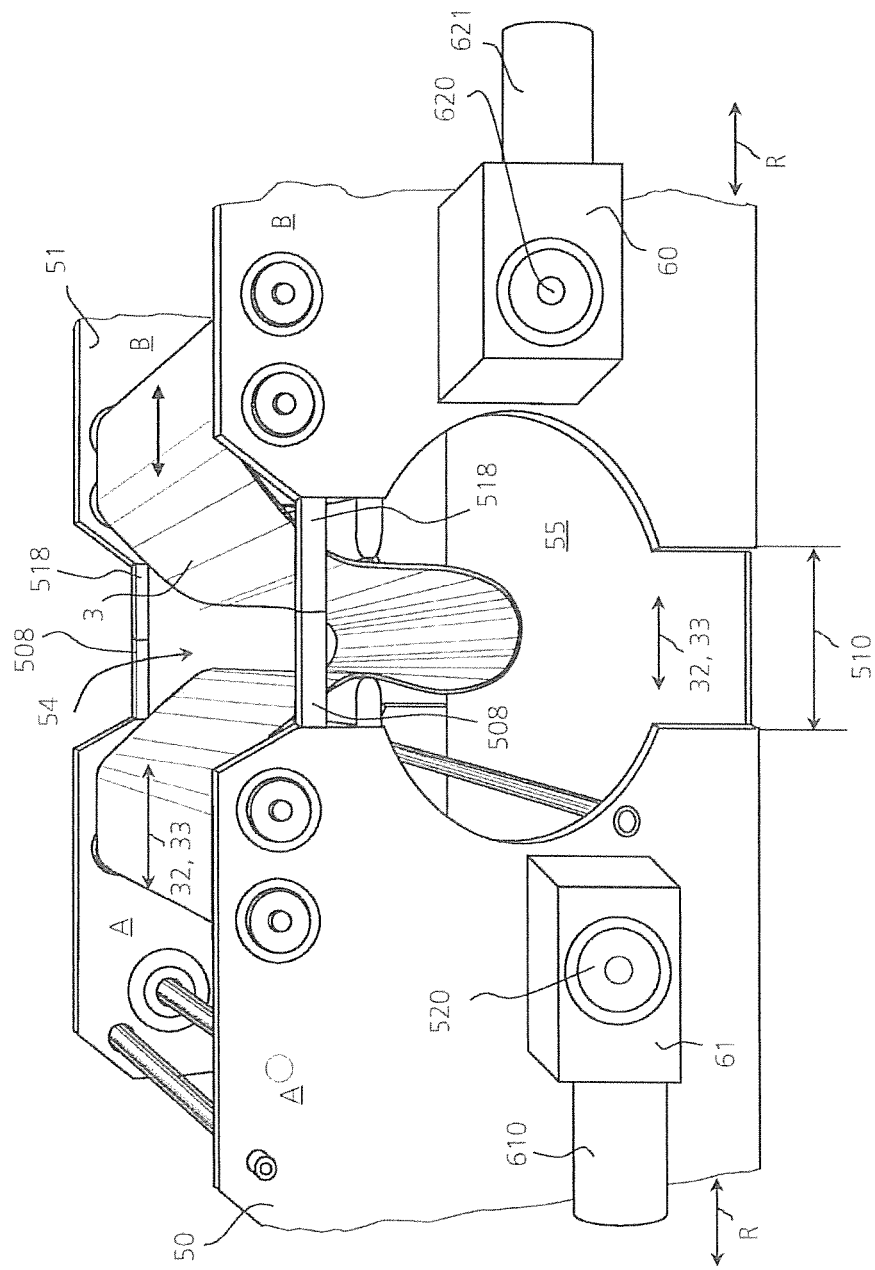

In FIGS. 8 to 10 are shown preferred sample embodiments of winding devices 5 for the wrapping of a body 10 of an exhaust system 1 with a metal strip 20. The winding devices 5 basically have two parallel arranged side pieces 50, 51 and several axles and shafts arranged perpendicular to the side pieces 50, 51 and mounted in the side pieces 50, 51 so as to rotate. In the sense of the invention, a shaft unlike an axle is driven in rotation.

Of the winding devices 5 shown in FIG. 8, only the rear side piece 51 and the axles 511-516, 562, 563, 569 as well as the shafts 520, 521, 560, 561 along with other parts yet to be described more closely are shown in cross section.

According to the sample embodiments of FIGS. 8 and 9, an endless belt-shaped conveyor element 3 able to move in at least one direction of conveyance 33 is mounted on the axles 511-516, 562 and the shaft 520. Thanks to several braces 58 arranged parallel to the axles 511-516, 562 and perpendicular to the two side pieces 50, 51, the two side pieces 50, 51 are arranged at a parallel distance AS from each other, which is greater than the width of the conveyor element 3 or the width 24 of the metal strip 20. The distance AS corresponds at least to the length 14 of the body 10, shown in FIG. 2. The braces 58 and the axles 511-516 produce a machine housing 57, in which the winding process occurs.

The belt-shaped conveyor element 3 is deflected by each of the axles 511-516 and at the same time driven by the shaft 520. For this, the shaft 520 is coordinated with a manual drive device 52, which drives the conveyor element 3 in a direction of conveyance 33 of the winding device 5. The drive device 52 comprises a toothed drive wheel 522, arranged on the drive shaft 520, for a toothed belt 523. The toothed belt 523 connects the drive wheel 522 to a gear 524, arranged on an intermediate drive shaft 521. On the intermediate drive shaft 521 the driving torque for the drive shaft 520 is introduced by a lever 500 per FIG. 9. The two gears 522, 524 have different diameters, so that the drive torque in the direction of the drive shaft 520 is reduced. The toothed belt 523 is stretched across a roller 504, which is arranged on an auxiliary axle 503 able to move parallel to the drive shaft 520 and mounted in an oblong hole 506. The displacement of the auxiliary axle 503 with the roller 504 in the oblong hole 506 occurs by an adjustment mechanism 525, arranged between the two side pieces 50, 51.

A tensioning device 56 is provided for tensioning the conveyor element 3. The tension of the conveyor element 3 is produced by the auxiliary axle 562, on which the conveyor element 3 is deflected. For this, the auxiliary axle 562 is movably mounted in an oblong hole 507 and can be adjusted by a pulling device 564 in the horizontal direction in the oblong hole 507.

The pulling device 564 is guided by form fit or frictional locking around a tensioning shaft 560 and moved by the tensioning shaft 560 in the oblong hole 507 in the pulling direction. The pulling device 564 deflected by the tensioning shaft 560 is pretensioned in the pulling direction upstream from the tensioning shaft 560 by a weight 565 hanging freely from the pulling device 564. For this, the pulling device 564 is deflected by two deflection axles 563, 569 arranged one behind the other in the direction of the conveyor element 3 and between the tensioning shaft 560 and the weight 565.

The tensioning shaft 560 is connected by a toothed belt 523 to an intermediate shaft 561. For this, a gear 566 is arranged on the tensioning shaft 560 and a gear 567 on the intermediate shaft 561. The toothed belt 523 can be adjusted by an adjustment mechanism 568, arranged between the two side pieces 50, 51.

In the sample embodiment of FIG. 10, an open conveyor element 3 is provided, whose ends are each wound on one of the two drive shafts 520, 620. The two drive shafts 520, 620 are each driven by an electric motor 60, 61, which is positioned on the side piece 50 at the shaft head and regulated by a controller 610, 621. Depending on the control system of the two electric motors 60, 61, the tension of the conveyor element 3 or the radial pressure on the body 10 necessary for the winding process is generated.

For the winding process, the body 10 is placed in a loop 30 formed by the conveyor element 3. For this, the two side pieces 50, 51 are divided in the horizontal direction and each pair of side pieces 50, 51 forms a front housing part A or a rear housing part B. The two housing parts A, B can be shoved apart in the horizontal direction R, so that the body 10 can be placed in the loop 30 between the two housing parts A, B. After the body 10 is put in place, the two housing parts A, B are shoved together once more and fixed to each other in direction R. For this, end stops 508, 518 are provided on the housing parts A, B according to FIG. 10, by which the housing parts A, B lie against each other in a direction R. The housing parts A, B thus have a definite spacing 510.

The stretched conveyor element 3 lies, as shown in FIG. 8 as an example, against the circumferential surface of the body 10. Between the body 10 and the conveyor element 3, the metal strip 20 is introduced. The conveyor element 3 is driven in one or both directions of conveyance 32, 33, depending on the sample embodiment, and the metal strip 20 is drawn in continuously.

The drawing in of the metal strip 20 and the shaping of the metal strip 20 by the conveyor element 3 becomes more precise and easy when a wrap angle u of the conveyor element 3 about the body 10 is as large as possible. The wrap angle u is increased by the arrangement of two deflection elements 530, 531, which are disposed parallel to the axles 511-516. The deflection elements 530, 531 form two opposite sliding edges, arranged across the entire width of the conveyor element 3, by which the conveyor element 3 slides or is deflected. The deflection elements 530, 531 are adjustable relative to the side pieces 50, 51 in the horizontal direction for changing the wrap angle u and they form a gap 54 with a width 540, beyond which the conveyor element 3 projects into a winding space 55.

The shafts and axles are in part mounted by bearings 59 in the side pieces 50, 51.

FIG. 11 shows one of two opposite guide plates 110. The guide plates 110 position the body 10 in the direction of the axis of rotation 100 within the winding space 55. Below the guide plate 110 there is an end stop 111 for the body 10.

FIG. 12 shows a feed 9 by which the metal strip 20 is introduced into the winding device 5. Thanks to the feed 9, the metal strip 20 is oriented and checked one last time for tolerances. Furthermore, guide elements 8 are provided on the two axles 512, 513, across which the conveyor element 3 runs immediately before and after the winding space 55, by which the conveyor element 3 is guided in the axial direction.

As shown in FIG. 4, the metal strip 20 is broader, or the housing 2 is longer than the body 10. The edge region 26 of the metal strip 20 projects beyond the edge of the body 10. During the winding process, one must ensure that the inner diameter of the housing 2 is constant over the entire length. FIGS. 13 and 14 show an expanding mandrel 70, which can be adapted in its diameter 71 to the nominal diameter 15 of the body. The expanding mandrel 70 is arranged coaxially to the body 10 per FIG. 14 and rotates along with the body 10 during the winding process. The edge region 26 of the metal strip 20 is wound onto the expanding mandrel 70, as shown in the cross section I-II of FIG. 14 according to FIG. 13, thus preventing the housing 2 from getting into the edge region 26.

What is claimed is:

1. A winding device for encasing a body of an exhaust system with a metal strip as the housing, comprising:
   a) at least two parallel arranged side pieces and several axles and shafts mounted in the side pieces and able to rotate and situated perpendicular to the side pieces, wherein the side pieces and the axles and shafts form a machine housing,
   b) a belt-shaped conveyor element, which is mounted on the axles and shafts and can be driven in at least one of the directions of conveyance by at least one driving device of the winding device, provided on the shafts,
   c) between the side pieces, two deflection elements, arranged parallel to the axles, forming a gap running parallel to the axles, with the conveyor element mounted on them in sliding manner,
   d) a winding space beneath the gap, bounded by the axles and situated between the side pieces,
   e) wherein the belt-shaped conveyor element projects on either side of the gap beyond the two deflection elements into the winding space and forms a loop in the winding space, in which the body being wrapped can be placed.

2. The winding device according to claim 1, wherein the conveyor element is closed endlessly or open, and at least two axles and at least two shafts are provided, around which the conveyor element is passed, while at least the shaft can be driven directly or indirectly via the drive device.

3. The winding device according to claim 1, wherein the winding device has a tensioning device and tension of the conveyor element can be adjusted directly or indirectly via the tensioning device and the tension can be used to vary or hold constant the radial pressure of the conveyor element in a direction perpendicular to an envelope surface of the body.

4. The winding device according to claim 2, wherein the open conveyor element is open and has two ends, while the respective end is wound each time on one of the shafts and the respective end is driven each time by a regulated motor.

5. The winding device according to claim 1, wherein at least a spacing forming the gap between the two deflection elements can be varied for placing the body in and taking it out.

6. The winding device according to claim 1, wherein the respective side piece is configured as a two-part piece and forms two housing pieces (A, B) each time, and the two housing pieces (A, B) can be displaced or swiveled to vary the spacing relative to each other in at least one direction R and also fixed relative to each other by an end stop on the side piece.

7. The winding device (5) according to claim 1, wherein an expanding mandrel of adjustable diameter or a spacer with a nonvariable diameter is provided, which is arranged coaxial to the body and can be wound onto an edge region of the metal strip.

8. The winding device according to claim 2, wherein the winding device has a tensioning device and tension of the conveyor element can be adjusted directly or indirectly via the tensioning device and the tension can be used to vary or hold constant the radial pressure of the conveyor element in a direction perpendicular to an envelope surface of the body, wherein the open conveyor element is open and has two ends, while the respective end is wound each time on one of the shafts and the respective end is driven each time by a regulated motor, and wherein at least a spacing forming the gap between the two deflection elements can be varied for placing the body in and taking it out.

9. The winding device according to claim 8, wherein the respective side piece is configured as a two-part piece and forms two housing pieces (A, B) each time, and the two housing pieces (A, B) can be displaced or swiveled to vary the spacing relative to each other in at least one direction R and also fixed relative to each other by an end stop on the side piece, and wherein an expanding mandrel of adjustable diameter or a spacer with a nonvariable diameter is provided, which is arranged coaxial to the body and can be wound onto an edge region of the metal strip.

* * * * *